United States Patent [19]
Norris

[11] Patent Number: 6,009,277
[45] Date of Patent: Dec. 28, 1999

[54] IMAGING APPARATUS AND METHOD OF HANDLING FILM

[75] Inventor: Philip R. Norris, North Reading, Mass.

[73] Assignee: Polaroid Corporation, Cambridge, Mass.

[21] Appl. No.: 09/219,556

[22] Filed: Dec. 23, 1998

Related U.S. Application Data

[63] Continuation-in-part of application No. 08/808,040, Mar. 4, 1997, Pat. No. 5,870,633, which is a continuation-in-part of application No. 08/738,772, Oct. 29, 1996, Pat. No. 5,838,999.

[51] Int. Cl.⁶ .......................... G03B 17/22; G03B 17/50
[52] U.S. Cl. ............................. 396/33; 396/32; 396/445
[58] Field of Search ............................... 396/30, 31, 32, 396/33, 41, 445

[56] References Cited

U.S. PATENT DOCUMENTS

| | | | |
|---|---|---|---|
| 3,289,560 | 12/1966 | Eloranta | 396/445 |
| 3,424,072 | 1/1969 | Hodgson et al. | 396/41 |
| 5,453,804 | 9/1995 | Norris et al. | 396/31 |
| 5,838,999 | 11/1998 | Norris | 396/33 |
| 5,870,633 | 2/1999 | Norris | 396/33 |
| 5,888,693 | 3/1999 | Meschter et al. | 430/208 |
| 5,943,511 | 8/1999 | Farrington et al. | 396/33 |

*Primary Examiner*—Alan A. Mathews
*Attorney, Agent, or Firm*—Leslie Payne

[57] ABSTRACT

An imaging apparatus and method for singulating individual film units from a self-developing integral film which units are carried serially in spaced apart relationship to each other are provided. The imaging portion of each unit is stiffer than associated leading and trailing portions whereby the leading portion beyond the pressure applying assembly is severed, while the severed flexible portion is diverted toward a receiving area therefor as the film unit advances along a path. Thereafter, provision is made for severing the strip along a trailing edge adjacent the imaging portion as the imaging portion advances along the path towards the exit; and, diverting the relatively flexible trailing portion from the path to a receiving area therefor as the film unit.

15 Claims, 10 Drawing Sheets

IMAGING APPARATUS AND METHOD OF HANDLING FILM

CROSS-REFERENCE TO RELATED APPLICATIONS

The present invention is a continuation-in-part application of commonly-assigned U.S. patent application Ser. No. 08/808,040, entitled "Photographic Apparatus and Method" filed in the U.S. Patent and Trademark Office on Mar. 4, 1997, now U.S. Pat. No. 5,870,633, and which is a continuation-in-part application of commonly-assigned and U.S. non-provisional patent application entitled "Dual Exposure Photographic Apparatus And Method", Ser. No. 08/738,772, filed in the U.S. Patent and Trademark Office on Oct. 29, 1996, and issued as U.S Pat. No. 5,838,999, and is related to U.S. non-provisional patent application No. 08/958,902 filed Oct. 28, 1997, now U.S. Pat. No. 5,888,693, and U.S. non-provisional patent application No. 08/959,361 filed Oct. 28, 1997.

BACKGROUND OF THE INVENTION

The present invention relates generally to photographic apparatus and, more particularly, film feeding mechanisms to be used in conjunction with photographic apparatus of the self-developing type and methods of operation thereof.

Heretofore, a wide variety of photographic apparatus of the self-developing type for exposing and processing film units have been proposed. Exemplary photographic apparatus of this type are described and illustrated in the following U.S. Pat. Nos.: 2,930,301; 3,405,619; 3,852,781; 4,114,166; 4,132,471; 4,172,647; 4,855,769; 5,103,249; and, 5,453,804. Typically, such cameras use self-developing film assemblages of either the peel-apart or integral kind. Cameras of the above type are cooperable with film systems, whereby the film frames are driven from the camera by some internal mechanism or are manually withdrawn by an operator exerting a pulling force on a film strip. During film advance, the film frames engage pressure applying mechanisms which act to rupture pods containing processing fluid and then spreading the latter over the film unit in order to initiate processing of the latent image.

While such apparatus are commercially successful and operate in a reliable manner, nevertheless there is a continuing desire for providing improved apparatus of the above type, especially from the standpoint of transferring and singulating individual film units.

SUMMARY OF THE INVENTION

In accordance with the present invention provision is made for a method of separating individual self-developing integral imaging portions having a leading rupturable pod carrying portion and a trailing trap carrying portion connected in spaced apart relationship in a continuous strip, whereby a trap portion of a preceding unit is connected to a pod portion of a successive unit, comprising the steps of: severing the strip adjacent a trailing portion of the imaging portion of preceding unit after completion of spreading of processing fluid in the preceding unit, and then severing the strip adjacent the leading portion of next successive imaging portion after initiation of spreading in the next successive unit, whereby both the trap carrying portion of the preceding unit and the pod carrying portion of the next successive unit are removable from the path.

In another embodiment, provision is made for a method of processing a film assemblage including a plurality of individual self-developing integral film units carried serially in spaced apart relationship on a continuous strip advanceable along a preselected path towards an exit from an imaging apparatus, wherein each film unit includes an imaging portion that is relatively stiffer than associated generally flexible leading and trailing portions of each unit, wherein each of the leading and trailing portions respectively carries a rupturable processing fluid reservoir and a trap; and at least an indexing structure is on at least the leading portion, said method comprising the steps of: positioning the indexing structure of a leading unit at a preselected location; processing the imaging portion by advancing the reservoir past a pressure applying assembly for rupturing the reservoir and spreading the released fluid onto an exposed imaging portion; severing the strip adjacent a leading edge portion of the imaging portion that passes beyond the pressure applying assembly; collecting the severed leading portion in an area away from the path in a collecting area therefor as the film unit continues to advance along the path; severing the strip adjacent a trailing edge portion of the imaging portion as the imaging portion; and, diverting the trailing portion of the film unit and a leading portion of the next successive film unit from the path to a collecting area therefor as the film unit advances; and, indexing the next successive film unit on the strip, whereby an indexing structure of the next successive film engages the indexing structure.

In an illustrated embodiment, provision is made for diverting the leading and trailing portions of each film unit as a function of the relative stiffness thereof in comparison to that of the imaging area.

In an illustrated embodiment, provision is made for a resiliently biased member selectively engaging the film unit at a point downstream of the pressure applying assembly wherein a biasing force thereof is selected to divert the relatively flexible and severed leading and trailing portions from the path to a receiving area and to allow a relatively stiffer imaging area to pass undiverted along the path.

In an illustrated embodiment, provision is made for having the leading and trailing portions made of a relatively limp material that will under the effects of gravity be diverted by gravity into the collecting area.

In an illustrated embodiment, provision is made for an imaging apparatus for use with a film assemblage including a plurality of individual self-developing film units carried serially in spaced apart relationship on a continuous strip that is advanceable along a path towards an exit from the imaging apparatus having an exit therefor, wherein each film unit includes an imaging portion that is, preferably, relatively stiffer than associated and preferably generally flexible leading and trailing portions of such units, wherein each leading and trailing portion respectively carries a rupturable processing fluid reservoir and a trap; and at least an indexing structure is on at least the leading portion, said imaging apparatus comprises: a housing assembly that defines a path of travel for allowing the strip to be advanced along a path from a supply therefor to an exit, and an exposure station positioned along the path; a pressure applying assembly within the housing assembly for rupturing the reservoir and spreading the processing fluid on an imaging portion of each film unit; a drive assembly that positively and intermittently drives the film strip from the supply to the exit; and a film severing assembly that is selectively operable to sever the strip at predetermined locations adjacent leading and trailing portions of the film area.

In an illustrated embodiment provision is made for an apparatus comprising a film diverting assembly that is operable to engage the film strip with a resiliently biasing force in a range that diverts the generally flexible leading and trailing portions from the path and yet allows the relatively stiffer imaging portion to travel along the path to the exit following passing the fluid processing assembly. In this latter embodiment, the diverting assembly includes a spring biased member engageable with the film strip.

It is an object of the present invention to provide for improved photographic apparatus and methods especially for use with film of the self-developing type which is simplified in construction and assembly and, therefore, low in cost as well as sufficiently miniature in nature in order to insure the user benefits of a miniaturized camera and photograph.

The above and other objects and scope of the present invention will become apparent following reading a detailed description thereof when taken in conjunction with the accompanying drawings in which like reference numerals indicate like structure throughout the several views.

DETAILED DESCRIPTION

Reference is initially made to FIGS. 1–6 for illustrating one preferred embodiment of a self-developing type photographic apparatus or camera 20. The camera 20 has, preferably, a miniature or compact construction and is manually operated for initiating processing of the film frames as well as for withdrawal of successive film frames from the camera. In one preferred embodiment, it is desired to have the camera 20 constructed in size carriable in, for example, a shirt pocket. The camera 20 is used, preferably, in combination with an improved film assemblage 22, such as shown in FIG. 7, which is more completely described in copending to U.S. non-provisional patent application No. 08/958,902 filed Oct. 28, 1997 and U.S. non-provisional patent application No. 08/959,361 filed Oct. 28, 1997; respectively. Hence, only those features thereof necessary for understanding the present invention will be described in the present application. For a more detailed description of the film assemblage 22, reference is made to the last-noted applications which are incorporated herein as a part hereof.

Essentially, the film assemblage 22 includes an elongated strip 24 containing in an alternating arrangement a plurality of successively aligned and identical film frames 26; for example twelve frames. Each of the film frames 26 includes a plurality of discrete and generally rectangular film units 28, preferably of the integral self-developing type. Each of the units 28 includes coextensive positive and negative sheets which are generally rectangular in shape and are in superposed relationship to one another. In addition, there is provided a pair of elongated rails 30 sandwiched therebetween with each rail extending along a corresponding longitudinal edge thereof. The film units 28 can have different size configurations, for example, 35 mm or APS sizes. At opposite ends of both units is coupled, such as adhesively, a pair of elongated superposed connecting sheets 32 and 34. The corresponding pairs of connecting sheet members 32 and 34 are laminated along their respective longitudinal margins for reasons to be explained. Before the sheet 34 is laminated to the sheet 32, a rupturable processing fluid pod 36 is adhesively secured in a generally transverse direction to the longitudinal extent of the sheet 34. Each of the pods 36 is secured at locations shown for each of the respective units 34. In addition, a trap means 38 is mounted to the sheet member 32. When the top sheet 34 is laminated to the lower sheet over the pod 36 and trap 38 at a trailing edge of the unit and between the units 28, the resulting construction allows for the passage of the processing fluid from the pod 34 to the unit 28 and from the unit to the trap 36. The construction of the foregoing assemblage is more completely described in the noted copending applications (is related to U.S. non-provisional patent application No. 08/958,902 filed Oct. 28, 1997 and U.S. non-provisional patent application No. 08/959,361 filed Oct. 28, 1997; respectively). Suffice it to say, however, when the pod is ruptured by a pressure applying means, a meniscus of the fluid leaving the pod travels into and between the spaced gap formed at a mouth of the film unit and then exits the film unit as it travels to the trap 36. In addition, the present invention contemplates that other film assemblages are usable. Perforations 39 are provided between a trailing edge of one frame 26 and a leading tab portion 41 of a succeeding film frame 26 to facilitate the automatic separation of the film frames. The invention contemplates other kinds of scored or weakened portions; such as semi-perforations.

Figure 7:
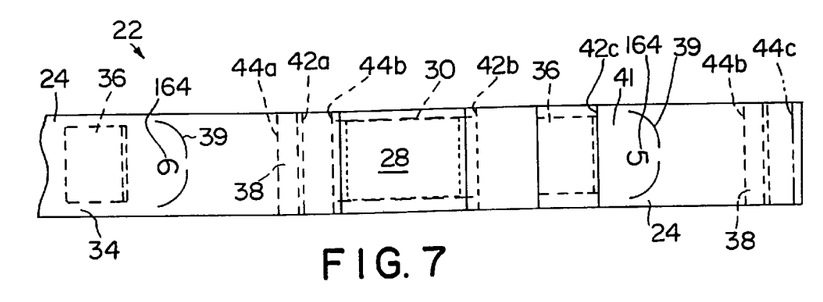
FIG. 7 is a schematic plan view of a film strip which can be used in connection with the camera of this invention.
Figure 8:
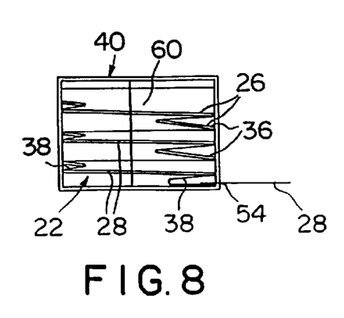
FIG. 8 is an enlarged schematic view of a film cassette which can be used in the camera of the present invention.
Figure 9:
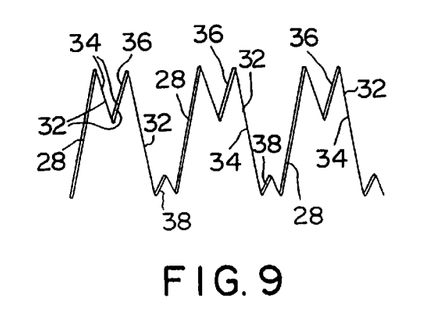
FIG. 9 is an enlarged view of a portion of film strip illustrating in greater detail the folding thereof.

With continued reference to FIGS. 7–9, the strip 24 is formed with a particular set of folds for effecting folding of the film frames 26, as is illustrated, in a compact manner such as within a film magazine or film container 40. In particular, the film assemblage 22 is folded so that the pod 36, film unit 28, and trap 38 for each corresponding film frame 26 are arranged generally coplanar as they are stored and as they exit from the container. This is advantageous for effecting a compact packaging arrangement of the film and ultimately reduces the size of the camera housing for receiving such components. In addition, the present invention contemplates that other folding arrangements of the film assemblages are usable. However in this embodiment for each film frame 26, there are so-called mountain or convex raised folded portions 42a, 42b, as viewed in the FIG. 7 and so-called valley or concave folds as shown at the fold lines 44a, 44b and 44c. As seen in FIG. 9, the film strip defining such a folding pattern forms a so-called "Wm." folding pattern because the configuration depicted in FIG. 9 appears similar to a the script of "Wm". This folding configuration is, preferred, since it allows the strip to more easily bend and fold in the storing cassette as it is being withdrawn. The relatively stiff segments of the film unit, pod, and trap exit the box without bending or rotating. Of course, other folding configurations are contemplated for use with the film strip of this invention, but the illustrated version is preferred.

Reference is now made back to FIGS. 1–6 and FIGS. 13, 14 & 19 for describing the camera 20. In the illustrated embodiment, provision is made for a housing assembly 45 comprising a front cover member 46, a rear cover member 48, as well as a loading door 50. The rear cover 48 is secured to the front cover 46 as by threaded members 52. The housing assembly 42 can be made of a variety of low-cost materials, such as cardboard and suitable plastics. The loading door 50 is pivotally mounted at a bottom end of the assembled front and back covers 46 and 48, such as is illustrated for movement between closed and open conditions; whereby when in the latter condition, a film box or container 40 as well as a leader portion 58 of the film strip 24 can be easily loaded in the camera. Although the camera, preferably, has a loading door 50 for reloading purposes, it will be appreciated that the present invention contemplates that the film container 40 can be prepackaged during camera manufacture for disposal.

The film container 40 is mounted within a cavity 60 formed on the loading door 50 so that the exit slot 54 is in alignment with a narrow passage 62 formed in a transverse wall 64. The narrow passage inhibits passage of multiple film units being transferred to the film plane at a single time. Also, the film path is narrower along the edges as at 66 to protect the pods. The film container 40 is also retained in the film cavity 68 formed by the L-shaped housing retainer 70.

Figure 1:
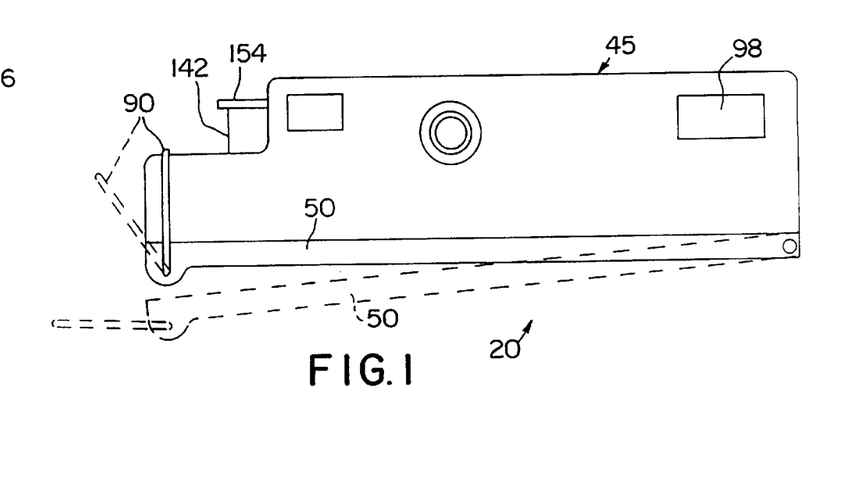
FIG. 1 is a front schematic view of a camera made according to the principles of the present invention.
Figure 2:
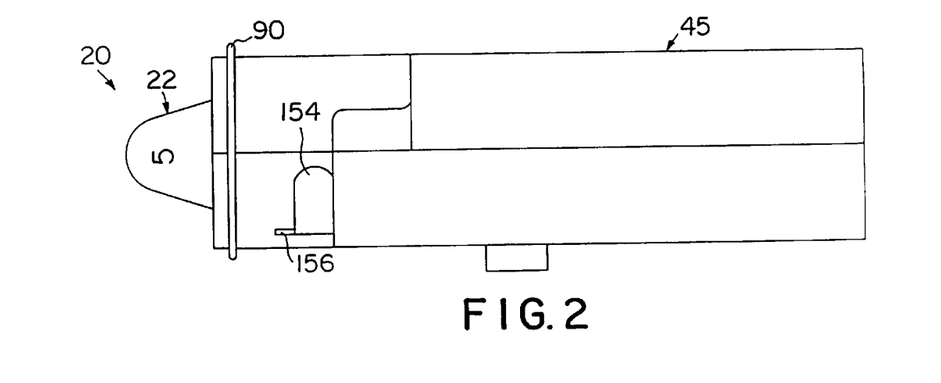
FIG. 2 is a plan schematic view of the camera illustrated in FIG. 1 with however a film tab extending outwardly therefrom.
Figure 3:
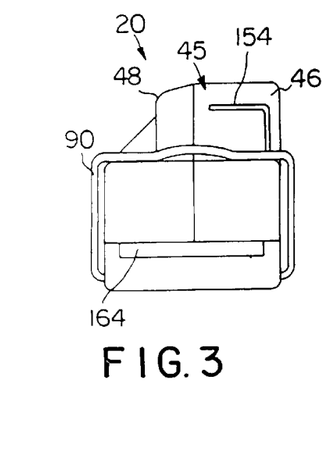
FIG. 3 is an end view of the camera depicted in FIGS. 1 and 2.
Figure 4:
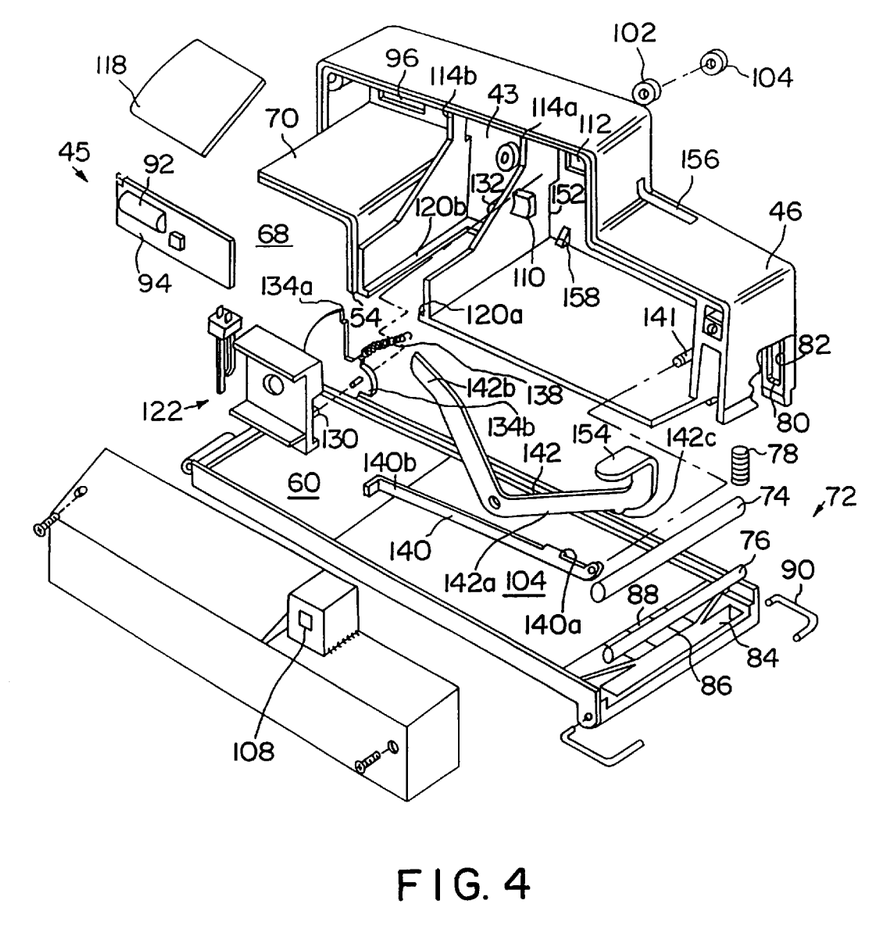
FIG. 4 is an exploded perspective of several components forming the camera.
Figure 5:
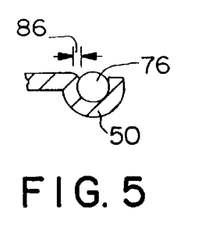
FIG. 5 is an enlarged and fragmented view of the lower roller of the pressure applying assembly being retained in a portion of a loading door.
Figure 6:
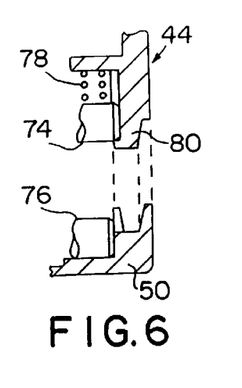
FIG. 6 is an enlarged, fragmented and partially exploded view of an end portion of the upper and lower spread rollers being retained.

Reference is now made to FIGS. 4–6 for illustrating one embodiment of a pressure applying means usable in the camera of this embodiment. The pressure applying means is a spread roller assembly 72 that is operable for rupturing the processing pods passing therebetween and spreading the fluid contents on the latent image to initiate processing thereof. The spread roller assembly 72 includes a pair of upper and lower spread rollers; 74 and 76. Preferably, the spread rollers 74, 76 can be made of cold rolled steel pins having a diameter of about ¼ in. This is because the film strip is always in the nip or roll bite and there is no external masking on the film. Accordingly, the spread rollers can be low-cost and straight since there is no requirement to pregap the spread rollers and no grooves or texture are needed. The spread rollers 74 and 76 need not be freely rotatable in operation, but at least provide a nip for rupturing the pod as the film strip passes therebetween. It should be noted that instead of a pair of spread rollers, spreader bars or other appropriate spreading mechanisms can be used. Accordingly, one or both of the spread rollers can be replaced by fixed spreading structure as is known. The upper roller 74 is resiliently biased onto the lower roller 76 under the influence of a pair of roll compression springs 78; one each engaging opposite longitudinal end portions of the upper roller. In this embodiment, the springs 78 each provide about three (3) pounds force. The rollers 74 and 76 are retained in suitable cavities within the assembled housing assembly. For retaining the upper roller, a ledge 80 (FIG. 6) is formed in a recess in the front cover; and a corresponding ledge (not shown) is formed in the rear cover. To guide vertical movement of the upper roller 74 both the front and rear covers are provided with vertical tracks 82 (only one is shown). It will be understood that both the housing assembly portions act to releasably retain the end portion of the upper roller in place. The upper roller can be slightly longer than the lower roller. The lower roller 76 is mounted for rotation in an elongated well 84 formed in the loading door 50. The lower roller is retained in place by an overhanging portion 86 of a fixture 88 mounted on the door. The spreader fixture 88 spreads uniformly the processing fluid after pod rupture. A locking bail 90 in a wire form is pivotally connected to the loading door 50 and cooperates with the assembled covers to releasably lock the door as well as serves load the springs 78.

Figure 18:
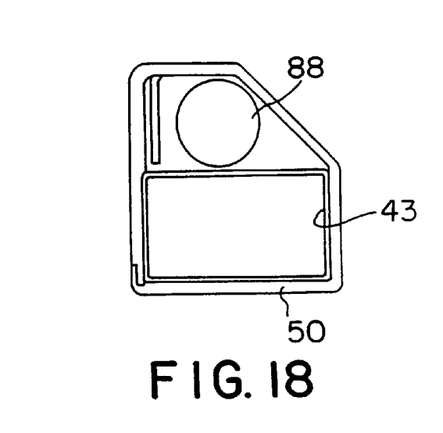
FIG. 18 is a schematic view of the present invention illustrating some of the components.
Figure 19:
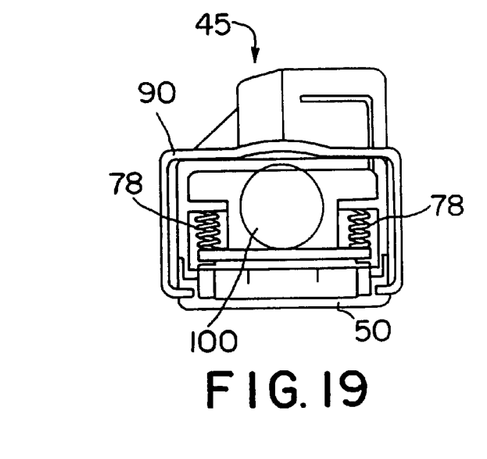
FIG. 19 is a schematic view of the present invention illustrating some of the components.

Reference is made to the FIG. 4, for illustrating an electronic strobe unit 92 that is mounted on an electric circuit board 94. The circuit board 94 is suitably mounted to a rear surface of the front cover 46 so that the strobe unit 92 is in registration with a front cover strobe window 96. A battery 88 provides a source of power and is mounted on the retainer wall 70 (see FIG. 18). A strobe capacitor 100 (FIG. 19) is mounted on an internal wall 102 of the front cover. It will be appreciated to those skilled in the art that the positioning of the circuit board, battery and strobe capacitor can be altered consistent with a variety of factors including spacing considerations. Since the camera is intended to be used predominantly for close-up photography there is not a requirement for a strobe and associated capacitor requiring significant power to operate effectively beyond four (4) feet.

Figure 17:
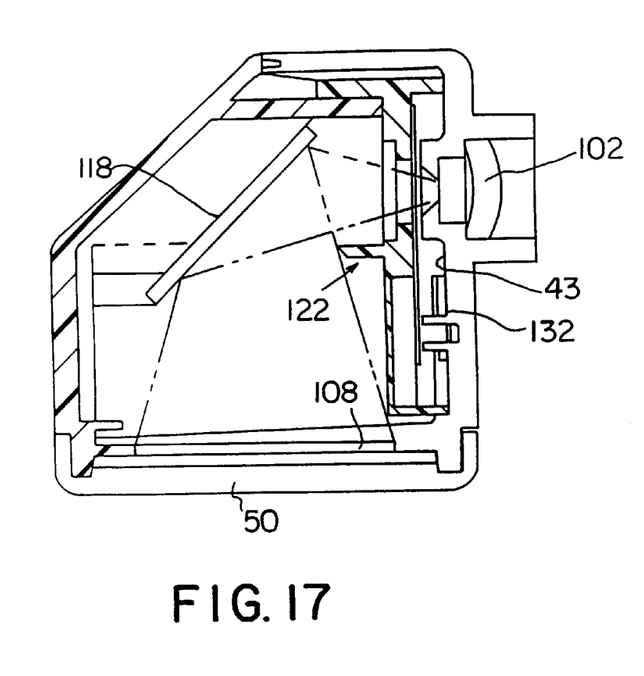
FIG. 17 is an enlarged cross-sectional schematic view of illustrating several components of the camera.

Continued reference is made to FIG. 4 for depicting a taking lens 102 that directs the image forming scene light to a film plane 104 formed on the loading door. The taking lens 102 is intended to take close-up photographs and is secured to the front cover by a lens retainer 106. A viewfinder 107 includes a window having a rear element 108 press-fit therein and a front element 110 press-fit in registration with a viewfinder window 112 on the front cover. The front cover includes a pair of rearwardly extending retaining walls 114a and 114b which, in part, define an exposure chamber 116. As is better shown in FIG. 17, a mirror 118 is mounted on and secured to downwardly sloped surfaces on the walls 114a, b, for directing the image forming scene light to the film plane 108. The retaining walls 114a, b have feet 120a, 120b; respectively, which define, in part, a field stop for the film unit at the focal plane. The feet 120a, 120b extend across the image plane image and thereby serves to form borders for each image. This minimizes the requirement on the film to provide masks for borders. Additionally, the walls 114a, b serve to baffle light.

Figure 10:
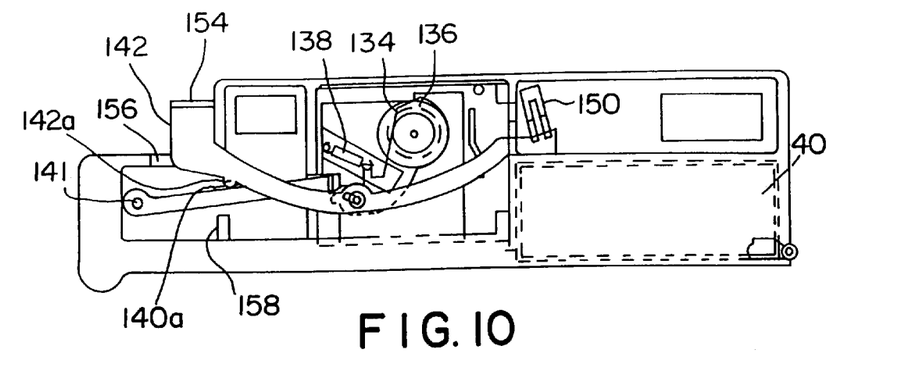
FIGS. 10–12 illustrate a release lever and shutter arrangement in three positions of operation including an initial at rest position, an intermediate position and a lower position.

Reference is made to FIGS. 4, 13, 15, 16A–C for illustrating the shutter blade assembly 122 which is of the bounce shutter type; but other shutter systems can be used. The shutter blade assembly 122 is mounted to the interior wall 43 of the front cover 46 and assists in light sealing the focal cone. Included in the shutter blade assembly 122 is a main body 124 defining an aperture 126 for passing light from an exposure stop aperture 128 in the front cover to the mirror 118. A downwardly extending protrusion 124a acts to seal the focal cone while top flange 124b locates the main body and forms a labyrinth seal, while a flare baffle 124c assists in defining a focal cone. A shutter blade pivot 130 on the body 124 nestles into a molded post 132 (FIG. 13) and supports and retains a shutter blade 134 which is mounted on the pivot for pivotal movement. The shutter blade 134 includes a stop 134a, a slot 134b, a hammer engaging extension 134c, and a tab hook 134d. The stop 134a is intended to strike a shelf stop 136 upon return to the shutter's closed condition. The tab hook 134d is attached to an extension spring 138 to allow the latter to bias the shutter blade to its at rest and closed condition. The slot 134b is adapted to slide over the pivot 130 and the extension spring 138 biases the shutter so that the shaft 130 is bottomed in the slot 134b; as is shown in FIG. 10.

The shutter blade assembly 122 is operatively associated with a shutter blade hammer 140 and a manually actuated release lever 142. The hammer 140 is an elongated arm pivoted on post 144 (FIG. 4) and biased by a spring 146 (FIG. 16A) to its upward position, such as shown in FIG. 10. The spring-biased hammer 140 is loosely pivotally mounted on the post 144 and is allowed limited movement along the axial direction of the shaft for reasons which become apparent after the hammer is cammed out of a plane of downward movement. The release lever 142 is mounted on the post 132 and is coaxial with the axis of rotation of the shutter blade for compactness. A release spring lever 148 (FIG. 16C) is attached to one arm 142a of the release lever in order to bias a distal end of the arm 142b downwardly and normally out of engagement with a strobe charging switch 150. It is also contemplated that the arm 142 can be shortened and instead actuate a strobe switch closer to its pivot for effecting an even more compact relationship of camera components. An elongated slot 152 (FIG. 4) in the retaining wall 120a allows pivotal movement of the release lever 142 therethrough, whereby a finger button 154 is biased upwardly through an opening 156 in the front cover.

Figure 11:
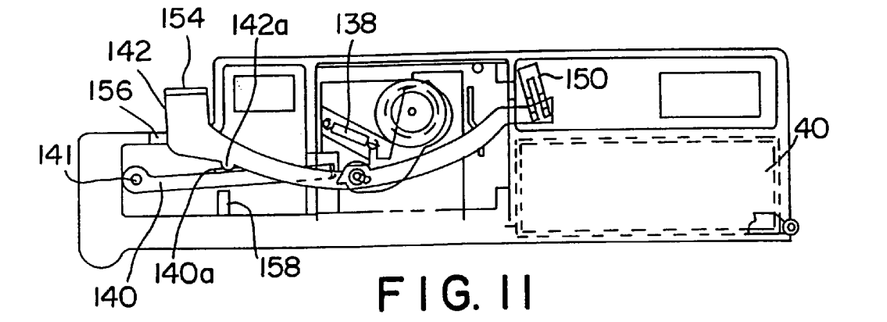
Figure 12:
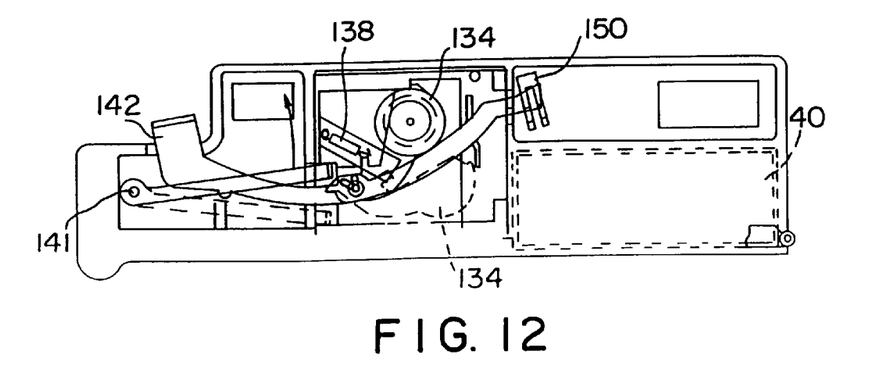
Figure 13:
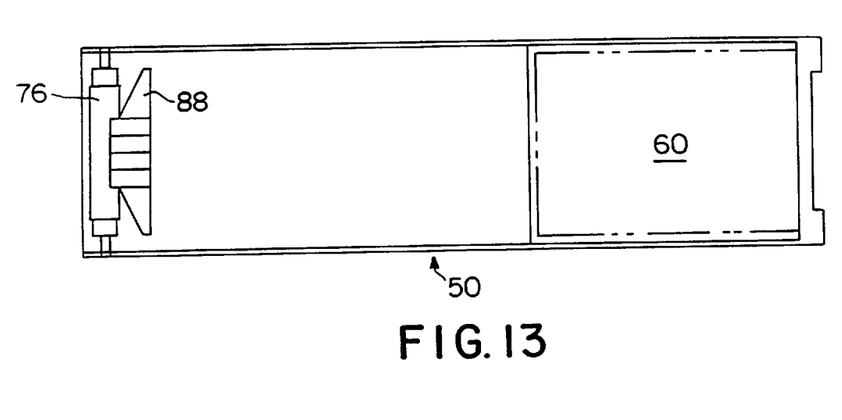
FIG. 13 is a plan view of the loading door which is contemplated for use.
Figure 14:
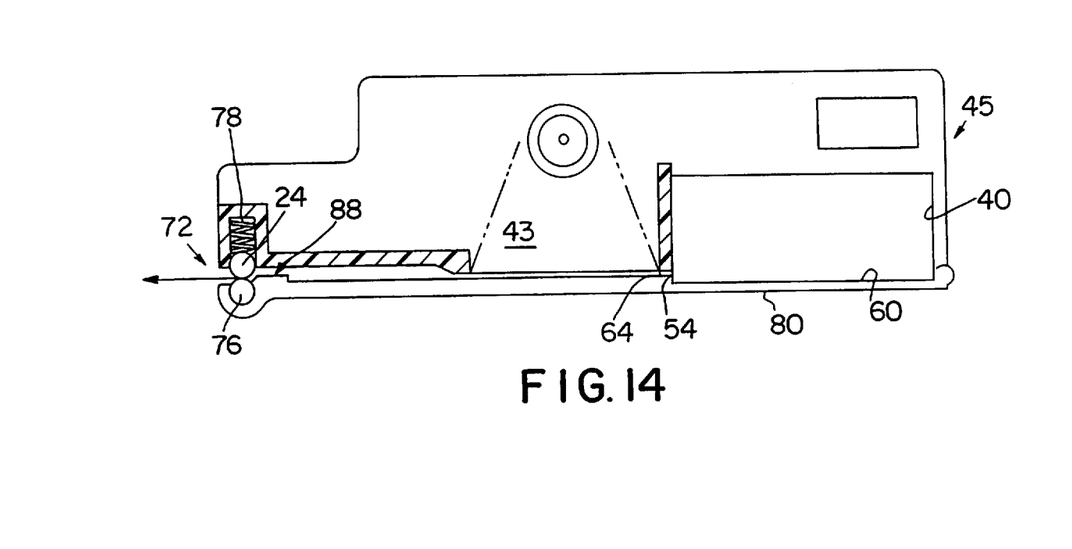
FIG. 14 is partial-schematic view of the camera in combination with the film strip.
Figure 15:
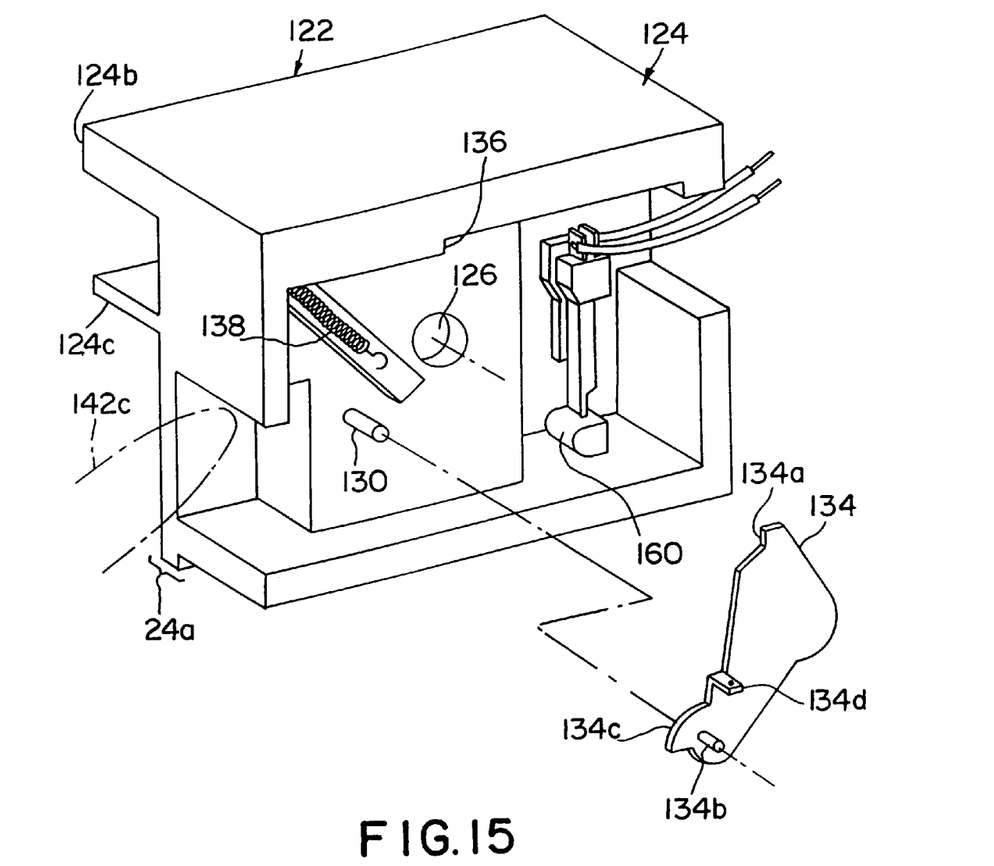
FIG. 15 is a perspective view of the camera shutter arrangement in combination with a release lever.
Figure 16A:
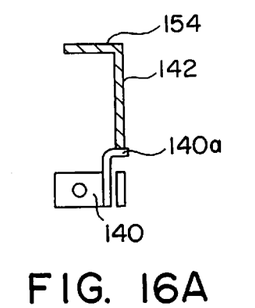
FIGS. 16A and 16B are schematic representations of the shutter and strobe charging operation of the present invention.
Figure 16B:
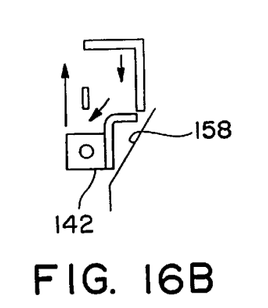
Figure 16C:
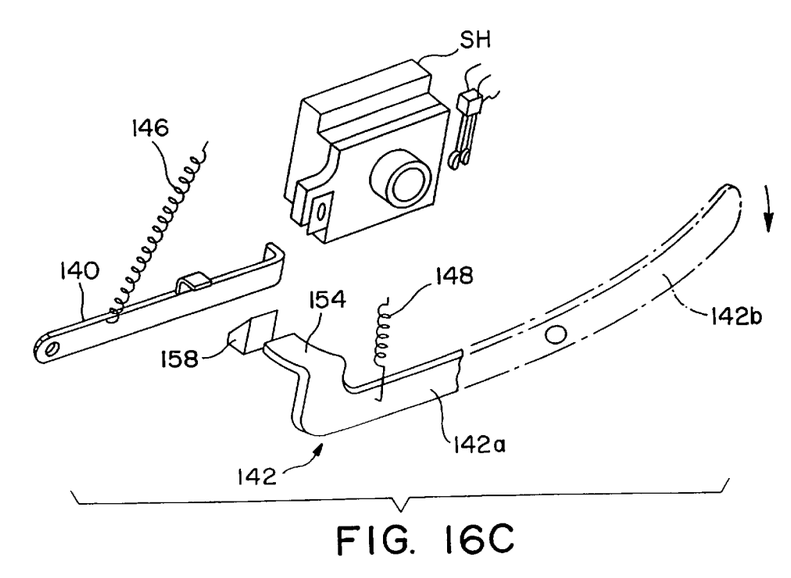
FIG. 16C is an exploded perspective of several components of the camera.

For actuating the release lever 142 and thereby effecting exposure and strobe firing continued reference is made primarily to FIGS. 4, 10–12 & 16A–C. The finger tab 154 of the release lever is pressed downwardly against the bias of its spring 148. Accordingly, the switch engaging end of the arm portion 142b actuates the strobe charging switch 150 for commencing charging of the strobe capacitor. Continued pressing causes the release lever 142 to have its extending tab 142c engage a tab 140a on the hammer 140 and correspondingly pivot it downwardly as well. As the hammer 140 is driven downwardly as shown in FIGS. 11 and 12, the hooked end 140b cams over the shutter tab 142c. As the release lever continues downward movement, the hammer 140 engages an inclined cam 158 molded in the front cover 46. In response, the hammer 140 is displaced axially away from the cam 158 and correspondingly free of the release lever 142; as seen in FIG. 16B. It will be recalled that there is a loose fit of the hammer on the shaft 141. Under the influence of the spring 146, the hammer 140 is pivoted in the opposite manner such that the hooked end 140b returns to its initial starting position (seen in phantom lines in FIG. 15) above the shutter tab 134b. During this return movement, as the hammer 140 returns to its original position, its hooked end 140b trips the shutter blade tab thereby allowing the shutter blade to move to its open position. This shutter 134 being of the well-known bounce type effects an exposure when the shutter blade moves from its light blocking condition to its light blocking condition and returns to its the original blocking condition whereat the stop 134a engages the shelf 136. The bounce shutter will engage a strobe fire switch 160. With this kind of shutter, the blade during movement to the open position will close the strobe firing switch 160, thereby discharging the capacitor and thus firing the strobe while the shutter is open. The blade during return to the closed position will open the strobe firing switch.

After the above description of the construction, the operation of the camera is selfevident. However, the following brief description is given as a supplement such description. In order to capture an image on the film units, the button 154 is depressed downwardly. As noted, the combination of the release lever and hammer effect a charging of the strobe when the switch 150 is actuated and then discharge the strobe when the shutter is tripped by the hammer and the strobe fire switch 160 is actuated by the shutter. Thereafter, under the influence of the springs the shutter blade 134 returns to its closed condition, thereby completing an exposure of the film at the exposure station. The release lever 140 is also returned to its original condition set for another exposure.

For processing the just exposed film frame, an operator pulls on a tab extending an appropriate distance from the camera. Accordingly, when the tab is pulled, the film unit which was just exposed is advanced through the spread rollers 74 and 76 for initiating processing of the latent. Outward displacement of the film strip from the housing exit slot 164, which may have an appropriate light seal member (not shown), continues until the next succeeding pod engages the spread rollers and indexes the succeeding film unit at the focal plane. In addition, the resistance encountered will create a drag on the strip 24 greater than the force holding the adjoining film units together at the perforations 39. As a consequence, the film frame 26 pulled from the camera automatically separates from the one remaining in the camera. In this connection, each film frame 26 is of such a size that the perforations are located so as to allow a tab of the remaining frame protrude a sufficient distance to be pulled. Each film frame tab 41 carries indicia 164 thereon indicating, for instance a numbering sequence selected to indicate the number of film frames remaining or exposed. The resistance of the pod will be overcome on the next pull. It will be appreciated that upon advancement of the film unit from the camera, the next succeeding film unit is automatically indexed from the container 40 along the surface 104 on the loading door 50 to the exposure station. As noted to facilitate the indexing or aligning of the pod, the pods are appropriately spaced with respect to the film units so that as the former engage the pressure applying rollers, the latter are located at the film plane ready for the next exposure. As noted, while a pod is shown for effecting an indexing action, the present invention would be able to index the next succeeding film unit at the focal plane by some other indexing mechanism as bumps or protrusions, preferably, added to the film assemblage, such as described in is related to U.S. non-provisional patent application No. 08/958,902 filed Oct. 28, 1997 and U.S. non-provisional patent application No. 08/959,361 filed Oct. 28, 1997. Although the pressure applying rollers are the structure which the pods engage for indexing, the present invention contemplates that the pods may engage other similar structure which would brake movement of the pod and also allow separation of the film frames automatically. Although the film advancement is generally straight, the present invention envisions that the film can be stored in different locations and advanced in other than generally straight paths as is done in the present embodiment.

Figure 20:
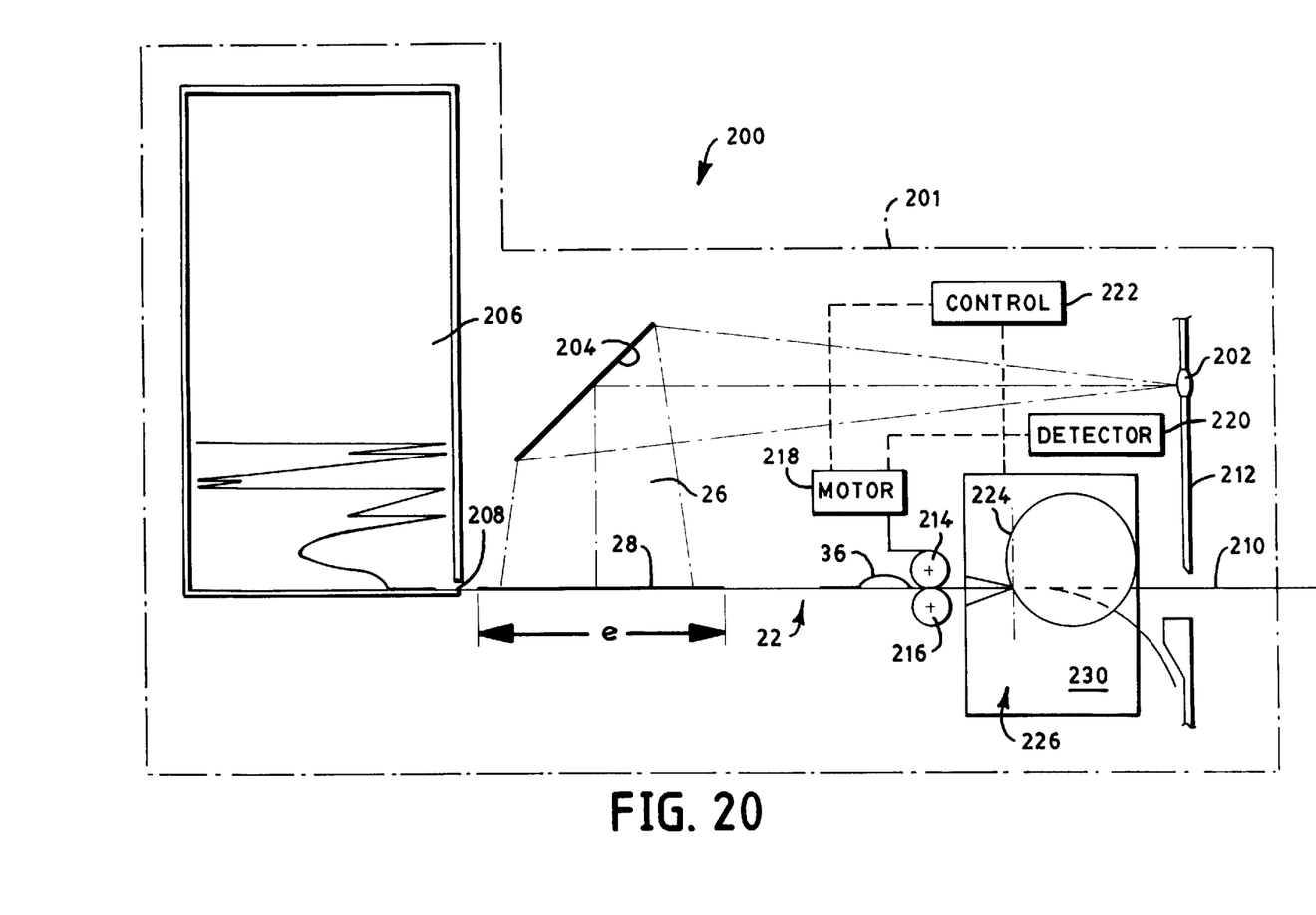
FIG. 20 is a schematic view of a photographic apparatus having an improved film transfer mechanism made according to the present invention in one mode of operation.
Figure 21:
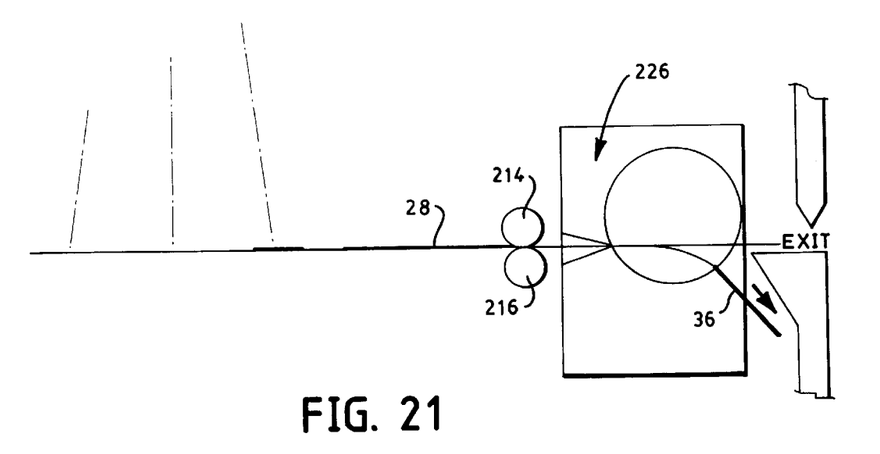
FIG. 21 is a schematic view of a photographic apparatus having an improved film transfer mechanism made according to the present invention in another mode of operation; and, FIG. 22 is a schematic view of a still another embodiment of a photographic apparatus having an improved film transfer mechanism made according to the present invention in one mode of operation.
Figure 22:
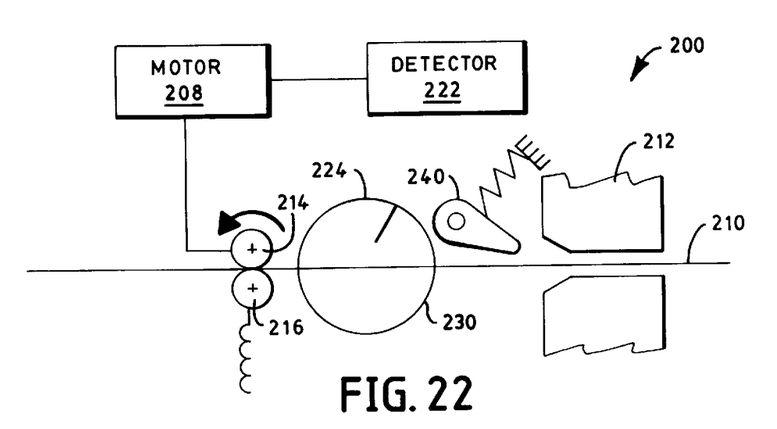

Reference is made to FIGS. 20–22 for illustrating another embodiment of the present invention. In this invention provision is made for an improved imaging apparatus 200 that cooperates with a film assemblage 22 of the last embodiment; a detailed description thereof is set forth above. Essentially, the film assemblage 22 includes an elongated strip 24 containing in an alternating arrangement a plurality of successively aligned and identical film frames 26; for example twelve frames. Each of the film frames 26 includes a plurality of discrete and generally rectangular image forming film units 28, preferably of the integral self-developing type. Each of the units 28 includes coextensive positive and negative sheets which are generally rectangular in shape and are in superposed relationship to one another. In addition, there is provided a pair of elongated rails (not shown) sandwiched therebetween with each rail extending along a corresponding longitudinal edge thereof. The image forming film units 28 can have different size configurations, for example, 35 mm or APS sizes. At opposite ends of both units is coupled, such as adhesively, a pair of elongated superposed connecting sheets (not shown). The corresponding pairs of connecting sheet members are laminated along their respective longitudinal margins for reasons to be explained. A rupturable processing fluid pod 36 is adhesively secured in a generally transverse direction to the longitudinal extent of the sheet. In addition, a trap means 38 is mounted on the film. The construction as noted above allows for the passage of the processing fluid from the pod to the unit and from the unit to the trap. The construction of the foregoing assemblage is more completely described in the noted copending applications (is related to U.S. non-provisional patent application No. 08/958,902 filed Oct. 28, 1997 and U.S. non-provisional patent application No. 08/959,361 filed Oct. 28, 1997; respectively). Suffice it to say, however, when the pod is ruptured by a pressure applying means, a meniscus of the fluid leaving the pod travels into and between the spaced gap formed at a mouth of the film unit and then exits the film unit as it travels to the trap. In addition, the present invention contemplates that other film assemblages are usable. Perforations are provided between a trailing edge of one frame 26 and a leading tab portion of a succeeding film frame 26 to facilitate the automatic separation of the film frames. The invention contemplates other kinds of scored or weakened portions. The image forming film units 28 by virtue of their construction even though they are flexible, are relatively rigid with respect the connecting sheets, pods and traps of the remainder to the film assemblage. The difference in relative stiffness between the film units 28 and the connecting sheets, pods and traps is sufficient, as will be pointed out, to enable the latter to be relatively more easily diverted from the path than the units. While the embodiment described discloses such a differential in terms of relative stiffness, the present invention contemplates that singulation of the film units can be achieved regardless of any or no stiffness differential. While the present invention discloses that the successive film units can be separated by frangible connections, it will, of course, be appreciated that the strip can be continuous without the need for perforations or the like.

The imaging apparatus 200 includes, preferably, a light-tight housing assembly 201 for use in a camera, a photobooth or the like imaging system wherein images can be recorded by virtue of optical, electronic or digital means on individual image forming portions of the film. In this embodiment, image forming scene light is directed from a lens 202 to a mirror 204 that redirects the image forming light onto image forming areas of the film. While a lens is illustrated, it will be appreciated that a variety of image producing means can be substituted. A film supply container 206 is mounted within a cavity formed in the housing so that the exit slot 208 thereof is in alignment with a narrow film exit slot or passage 210 formed in a transverse wall 212. A light shield (not shown) is provided adjacent the film exit slot.

As illustrated, the strip 24 is formed with a particular set of folds for effecting folding of the film frames 26 in a compact manner, such as within the film supply container 206. In particular, the film assemblage 22 is folded so that the each pod, film unit and trap for each corresponding film frames are arranged generally coplanar as they are stored and as they exit from the container. This is advantageous for effecting a compact packaging arrangement of the film and ultimately reduces the size of the camera housing for receiving such components. A leading portion of the film unit includes that portion of the strip from about before the pod to the imaging portion. A trailing portion includes that portion of the film unit that is severed from adjacent the trailing edge portion including the trap and that portion of the film upto about the pod.

FIGS. 20–21 illustrate a sequence of operational modes for one preferred embodiment of a film advancing mechanism of the present invention, wherein a film strip of the self-developing type is advanced under power of the pressure rollers and the linearly spaced individual film units carried thereon in end-to-end fashion are separated mechanically. In the present embodiment, provision is made for advancing and singulating the film units from the strip. A film advancing mechanism is operable for advancing an elongated film strip. In this embodiment, a film processing assembly for self-developing film includes a pair of motorized spread rolls 214, 216 that are biased together to define a nip. A motor 218 and suitable gearing (not shown) of any conventional type can be used that are operable for driving the rollers in a manner to selectively advance the film units from the container and deliver them to a film exit slot 210 formed in the wall 212. While this invention is disclosed in terms of providing the advancing and singulating functions for the instant film strip herein disclosed, the broader aspects are not so limited and thus the present invention can be used with a variety of media containing a plurality of image recording units arranged in end-to-end relationship.

In the at rest condition, as depicted in FIG. 20, a film pod 36 of an unexposed film frame rests against the rollers 214, 216. Following film exposure, the motor 218 is operated to advance the film strip. As a result, the pod is burst and the processing fluid is spread between the positive and negative sheets to initiate development of the latent images. The motor 218 operates under control of an electrically powered control mechanism 222. The motor 218 continues to operate until a leading end portion of the strip, preferably immediately adjacent a leading portion of a film unit is at a cutting plane 224, whereby the strip is transversely severed by operation of, preferably an electric powered rotary knife mechanism 226. In this embodiment, the leading portion of the severed film frame portion drops under the influence of gravity from the linear path the strip follows to a collecting area 230; since the film is unsupported in this region of the apparatus. Following the initial cutting step, the motor 218 is again operated to intermittently advance the film strip until an area of the connecting strips immediately adjacent a trailing portion of the film unit is at the film cutting plane 224; whereupon film movement ceases. It will be appreciated that the film unit is of sufficient length to have its leading end portion extend beyond the film exit. The knife mechanism is operable to effect a second cutting action on the strip adjacent a trailing edge portion of the imaging portion; whereby the film unit becomes singulated and ready for removal while the trailing portion of the cut unit including the trap fall from the path under the influence of gravity to the collecting area. The latter will happen since the frangible connection, should one be present, will not separate. It will be appreciated the diverting step is facilitated because the leading and trailing sections are relatively thin and limp. As a result, they will under the influence of gravity fall into the collecting area. The periodic operations of the motor and knife cutting mechanisms are under the control of the control mechanism 222. The detector 220 can locate positions on the film strip for effecting the starting thereof. In this embodiment, the detector approach can be a non-visible reflective photodiode/detector pair (not shown) that could sense the mask/film unit interface and appropriately halt the motor. A detector target could be printed on or attached to the film strip. Furthermore, a timing gear could halt the motor in the usual way after the trap is cleared of the rollers. An overrunning clutch (not shown) could be used to allow the user to finish the advance motion during a manual tear. The motor would be operated again to rotate the film spreading rollers and thereby feed the film strip a preselected length until a processing pod engages the rollers.

FIG. 22 illustrate still another embodiment wherein there is provided a film diverting mechanism for positively diverting the spent pod and trap on the respective leading and trailing portions into a collecting area 230 therefor. The diverting assembly includes a spring-biased element 240 that rides on the film strip. The biasing force selected is to ensure that the film unit, which is relatively stiffer compared to the leading and trailing portions carrying the pod and trap, will be able to pass along towards the exit. The biasing force is selected on the other hand to positively divert the severed leading and trailing portions to the collection area. While this embodiment describes a system whereby the diverting assembly operates as a function of the relative stiffness between the leading and trailing portions, it need not be so constructed, but rather could include any system for effecting diversion of the leading and trailing portions from the path of movement.

Although several specific and preferred methods and apparatus of the present invention have been shown and described above, other variations of the present invention will become apparent to those skilled in the art. The scope of the invention is therefore not limited to the specific forms shown and described but rather is indicated by the claims below.

What is claimed is:

1. A method of separating individual self-developing integral imaging portions having a leading rupturable pod carrying portion and a trailing trap carrying portion connected in spaced apart relationship in a continuous strip, whereby a trap portion of a preceding unit is connected to a pod portion of a successive unit, comprising the steps of: severing the strip adjacent a trailing portion of the imaging portion of preceding unit after completion of spreading of processing fluid in the preceding unit, and then severing the strip adjacent the leading portion of next successive imaging portion after initiation of spreading in the next successive unit, whereby both the trap carrying portion of the preceding unit and the pod carrying portion of the next successive unit are removable from the path.

2. The method of claim 1 wherein the severed trap and pod portions are removed from the path by diverting them into a collecting area.

3. A method of processing a film assemblage including a plurality of individual self-developing integral film units carried serially in spaced apart relationship on a continuous strip that is advanceable along a preselected path towards an exit from an imaging apparatus having an exit therefor, wherein each unit includes an imaging portion and leading and trailing portions, the leading and trailing portions respectively carry a rupturable processing fluid reservoir and a trap; and at least an indexing structure is on at least the leading portion, said method comprising the steps of: positioning the indexing structure of one unit against an indexing structure; processing the imaging unit by advancing the reservoir past the structure to a pressure applying assembly that ruptures the reservoir and spreads the released processing fluid onto an exposed imaging portion for initiating development thereof; and, severing the strip along a leading edge portion adjacent the imaging portion which passes beyond the pressure applying assembly; diverting the severed leading portion including the reservoir from the path towards a collecting area therefor as the film unit continues to advance along the path; severing the strip along a trailing edge adjacent the imaging portion as the film unit advances along the path towards the exit; diverting the trailing portion including the trap from the path to the collecting area therefor as the film unit advances, whereby the reservoir from the next successive film unit follows the trap of the preceding film unit after severance of the reservoir portion of the next successive film unit.

4. The method of claim 3 further including the intermediate step of indexing the next successive film unit by having a reservoir of a leading portion of the next successive film engage the indexing structure before the leading portion of the imaging portion is severed.

5. The method of claim 4 wherein the step of having the indexing structure engage a structure is performed by having the indexing structure engage the pressure applying assembly.

6. The method of claim 4 including the preliminary step of providing each film unit with an imaging portion that is relatively stiffer than associated generally flexible leading and trailing portions of such units.

7. The method of claim 6 wherein the step of diverting the leading and trailing portions includes allowing the leading and trailing portions to fall under the influence of gravity from the path.

8. The method of claim 4 wherein the step of diverting the leading and trailing portions includes having a resiliently biased member selectively engaging the film unit at a point downstream of the pressure applying assembly along the path wherein a biasing force is selected to divert the relatively flexible and severed leading and trailing portions from the path and to allow the relatively stiffer imaging area to pass undiverted along the path.

9. The method of claim 5 wherein said indexing step includes spacing each of the reservoirs from the next succeeding film unit by a distance which insures that the next film unit is properly registered at an exposure station upon the reservoir engaging the pressure applying means.

10. The method of claim 6 wherein each of the withdrawn film units exit the container and emerge from the housing along a generally straight path.

11. A method of singulating individual film units from a film assemblage including a plurality of individual self-developing integral film units carried serially in spaced apart relationship on a continuous strip that is advanceable along a preselected path, wherein each film unit includes an imaging portion that is relatively stiffer than associated generally flexible leading and trailing portions of such units, wherein each leading and trailing portion respectively carries a rupturable processing fluid reservoir and a trap; processing the imaging portion by advancing the reservoir past a pressure applying assembly that ruptures the reservoir and spreads the released processing fluid onto an exposed imaging portion for initiating development thereof; and, severing the strip along a leading edge portion adjacent the imaging portion which passes beyond the pressure applying assembly; diverting the severed and relatively flexible leading portion from the path towards a receiving area therefor as the film unit continues to advance along the path; severing the strip along a trailing edge adjacent the imaging portion as the imaging portion advances along the path towards the exit; and, diverting the relatively flexible trailing portion from the path to a receiving area therefor as the film unit.

12. An imaging apparatus for use with a film assemblage comprising a plurality of individual self-developing film units carried serially in spaced apart relationship on a continuous strip that is advanceable along a path towards an exit from the imaging apparatus having an exit therefor, wherein each film unit includes an imaging portion that is relatively stiffer than associated generally flexible leading and trailing portions of such units, wherein each leading and trailing portion respectively carries a rupturable processing fluid reservoir and a trap; and at least an indexing structure is on at least the leading portion, said imaging apparatus comprises: a housing assembly that defines a path of travel for allowing the strip to be advanced along a path from a supply therefor to an exit, and an exposure station positioned along the path; a pressure applying assembly within the housing assembly for rupturing the reservoir and spreading the processing fluid on an imaging portion of each film unit; a drive assembly that positively and intermittently drives the film strip from the supply to the exit; and a film severing assembly that is selectively operable to sever the strip at predetermined locations adjacent leading and trailing portions of the film area.

13. The apparatus of claim 12 further comprising a film diverting assembly that allows the film to be diverted under the influence of gravity into a collecting area.

14. The apparatus of claim 12 further comprising a film diverting assembly that is operable to engage the film strip with a resiliently biasing force in a range that diverts the generally flexible leading and trailing portions from the path and yet allows the relatively stiffer imaging portion to travel along the path to the exit following passing the fluid processing assembly.

15. The apparatus of claim 14 wherein the diverting assembly includes a spring biased member that engages the film strip.

* * * * *